United States Patent
Kuroki et al.

(10) Patent No.: US 9,405,525 B2
(45) Date of Patent: Aug. 2, 2016

(54) COMPUTER SYSTEM AND DEVICE DRIVER INSTALLATION METHOD

(71) Applicant: Hitachi, Ltd., Tokyo (JP)

(72) Inventors: Takahiro Kuroki, Tokyo (JP); Yusuke Yamamoto, Tokyo (JP); Daiki Abe, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 91 days.

(21) Appl. No.: 14/310,144

(22) Filed: Jun. 20, 2014

(65) Prior Publication Data

US 2015/0040119 A1     Feb. 5, 2015

(30) Foreign Application Priority Data

Aug. 2, 2013   (JP) ................................ 2013-161245

(51) Int. Cl.
*G06F 9/445* (2006.01)
*G06F 9/44* (2006.01)

(52) U.S. Cl.
CPC .. *G06F 8/61* (2013.01); *G06F 8/60* (2013.01); *G06F 9/4411* (2013.01)

(58) Field of Classification Search
CPC ........................ G06F 8/60–8/68; G06F 9/4411
See application file for complete search history.

(56) References Cited

U.S. PATENT DOCUMENTS

| | | | | |
|---|---|---|---|---|
| 5,873,085 A * | 2/1999 | Enoki | ............... | G06F 17/30067 |
| 7,251,812 B1 * | 7/2007 | Jhanwar | ..................... | G06F 8/65 713/100 |
| 7,752,290 B2 * | 7/2010 | Ebata | ..................... | G06F 9/4411 358/1.13 |
| 7,856,630 B2 * | 12/2010 | Goicea | ..................... | G06F 8/60 717/121 |
| 8,117,612 B2 * | 2/2012 | Flegg | ........................ | G06F 8/63 717/171 |
| 8,341,384 B2 * | 12/2012 | Matthew | ................... | G06F 8/60 713/1 |
| 8,607,059 B2 * | 12/2013 | Mason | ...................... | G06F 8/61 380/243 |
| 8,612,516 B2 * | 12/2013 | Mallur | ..................... | G06F 8/60 709/203 |
| 8,707,298 B2 * | 4/2014 | Araki | .................... | G06F 9/4411 358/1.15 |

(Continued)

FOREIGN PATENT DOCUMENTS

| | | |
|---|---|---|
| EP | 0518311 A2 | 12/1992 |
| EP | 0774723 A2 | 5/1997 |

(Continued)

OTHER PUBLICATIONS

Pruett et al., BladeCenter systems management software, [Online] Nov. 2005, IBM Journal of Research and Development, vol. 49, No. 6, [Retrieved from the Internet] <http://ieeexplore.ieee.org/stamp/stamp.jsp?tp=&arnumber=5388766&isnumber=5388752>, pp. 963-975.*

(Continued)

*Primary Examiner* — Thuy Dao
*Assistant Examiner* — Ravi K Sinha
(74) *Attorney, Agent, or Firm* — Volpe and Koenig, P.C.

(57) ABSTRACT

A computer system includes: storing a first file management table that stores a record associating a device driver that can be installed in the computer system with identification information of a logic area in which the particular device driver is stored; reading a second file management table stored in a recording medium placed in the drive, generating a third table by inserting the record in the first management table into the second management table, and generating a virtual file management table that associates the third table with the device driver stored in the first table as well as the device driver stored in the second table, and searching for the device driver requested, install the requested device driver.

8 Claims, 8 Drawing Sheets

(56) References Cited

U.S. PATENT DOCUMENTS

| | | | |
|---|---|---|---|
| 8,804,172 B2* | 8/2014 | Ichikawa | G06F 3/1204 358/1.13 |
| 8,875,125 B2* | 10/2014 | Liles | G06F 8/60 717/174 |
| 9,001,345 B2* | 4/2015 | Nakata | G06F 9/4411 358/1.13 |
| 9,032,394 B1* | 5/2015 | Shi | G06F 8/61 717/121 |
| 9,052,916 B2* | 6/2015 | Cepulis | G06F 8/65 |
| 9,069,572 B2* | 6/2015 | Wang | G06F 9/4413 |
| 9,092,231 B2* | 7/2015 | Park | G06F 9/4411 |
| 9,146,748 B1* | 9/2015 | Kumar | G06F 8/61 |
| 9,158,662 B1* | 10/2015 | Hanes | G06F 8/61 |
| 2003/0065913 A1* | 4/2003 | Cepulis | G06F 9/4411 713/1 |
| 2007/0101342 A1 | 5/2007 | Flegg et al. | |

FOREIGN PATENT DOCUMENTS

| | | |
|---|---|---|
| JP | 05-241934 A | 9/1993 |
| JP | 2007-280171 A | 10/2007 |

OTHER PUBLICATIONS

Zhou et al., Virtual disk based centralized management for enterprise networks, [Online] 2006, In Proceedings of the 2006 SIGCOMM workshop on Internet network management (INM '06). ACM, New York, NY, USA, [Retrieved from the Internet]<http://dx.doi.org/10.1145/1162638.1162642> pp. 23-28.*

Hou et al., Embedded system design with Windows 7 Approach, [Online]2012, Systems and Informatics (ICSAI), 2012 International Conference on, [Retrieved from the Internet] <http://ieeexplore.ieee.org/stamp/stamp.jsp?tp=&arnumber=6223168&isnumber=6223032> pp. 957-961.*

* cited by examiner

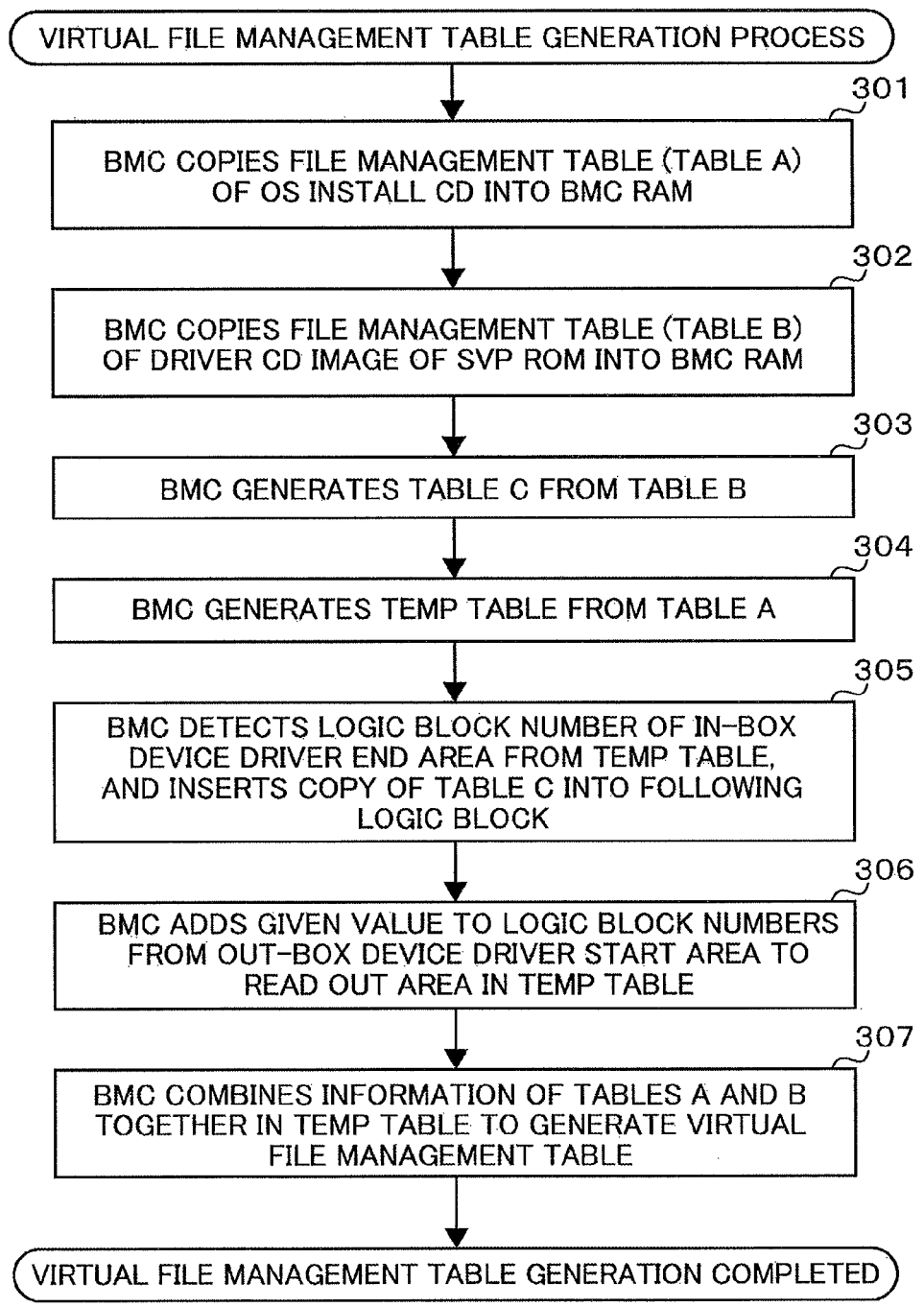

F I G. 4A

| CD INFOR-MATION | LOGIC BLOCK NUMBER | AREA NAME | ATTACHED DATA |
|---|---|---|---|
| A | 256 | READ-IN AREA | READ-IN INFORMATION |
| | 1000 | IN-BOX DEVICE DRIVER START AREA | IN-BOX DRIVER |
| | 1999 | IN-BOX DEVICE DRIVER END AREA | 1,2, ...n |
| | 2000~ | OTHER AREAS | OTHER DATA |
| | 10000 | READ-OUT AREA | READ-OUT INFORMATION |

F I G. 4B

| CD INFOR-MATION | LOGIC BLOCK NUMBER | AREA NAME | ATTACHED DATA |
|---|---|---|---|
| B | 256 | READ-IN AREA | READ-IN INFORMATION |
| | 1000 | OUT-BOX DEVICE DRIVER START AREA | OUT-BOX DRIVER |
| | 1999 | OUT-BOX DEVICE DRIVER END AREA | 1,2, ...n |
| | 2000~ | OTHER AREAS | OTHER DATA |
| | 10000 | READ-OUT AREA | READ-OUT INFORMATION |

F I G. 4C

| CD INFOR-MATION | LOGIC BLOCK NUMBER | AREA NAME | ATTACHED DATA |
|---|---|---|---|
| B | 256 | READ-IN AREA | READ-IN INFORMATION |
| | 1000 | OUT-BOX DEVICE DRIVER START AREA | OUT-BOX DRIVER |
| | 1999 | OUT-BOX DEVICE DRIVER END AREA | 1,2, ...n |
| | 2000~ | OTHER AREAS | OTHER DATA |
| | 10000 | READ-OUT AREA | READ-OUT INFORMATION |

COPY

| LOGIC BLOCK NUMBER | AREA NAME | ATTACHED DATA |
|---|---|---|
| 1000 | OUT-BOX DEVICE DRIVER START AREA | OUT-BOX DRIVER |
| 1999 | OUT-BOX DEVICE DRIVER END AREA | 1,2, ...n |

| LOGIC BLOCK NUMBER | AREA NAME | ATTACHED DATA |
|---|---|---|
| 256 | READ-IN AREA | READ-IN INFORMATION |
| 1000 | IN-BOX DEVICE DRIVER START AREA | IN-BOX DRIVER 1,2,...n |
| 1999 | IN-BOX DEVICE DRIVER END AREA | |
| 2000 | OUT-BOX DEVICE DRIVER START AREA | OUT-BOX DRIVER 1,2,...n |
| 2999 | OUT-BOX DEVICE DRIVER END AREA | |
| 3000~ | OTHER AREAS | OTHER DATA |
| 11000 | READ-OUT AREA | READ-OUT INFORMATION |

FIG. 4F

| VIRTUAL AREA | | | CD INFOR- MATION | ACTUAL AREA | | |
|---|---|---|---|---|---|---|
| LOGIC BLOCK NUMBER | AREA NAME | ATTACHED DATA | | ACTUAL LOGIC BLOCK NUMBER | ACTUAL AREA NAME | ACTUAL ATTACHED DATA |
| 256 | READ-IN AREA | READ-IN INFORMATION | | 256 | READ-IN AREA | READ-IN INFORMATION |
| 1000 | IN-BOX DEVICE DRIVER START AREA | IN-BOX DRIVER | A | 1000 | IN-BOX DEVICE DRIVER START AREA | IN-BOX DRIVER |
| 1999 | IN-BOX DEVICE DRIVER END AREA | 1,2,...n | | 1999 | IN-BOX DEVICE DRIVER END AREA | 1,2,...n |
| 2000 | OUT-BOX DEVICE DRIVER START AREA | OUT-BOX DRIVER | B | 1000 | OUT-BOX DEVICE DRIVER START AREA | OUT-BOX DRIVER |
| 2999 | OUT-BOX DEVICE DRIVER END AREA | 1,2,...n | | 1999 | OUT-BOX DEVICE DRIVER END AREA | 1,2,...n |
| 3000~ | OTHER AREAS | OTHER DATA | A | 2000~ | OTHER AREAS | OTHER DATA |
| 11000 | READ-OUT AREA | READ-OUT INFORMATION | | 10000 | READ-OUT AREA | READ-OUT INFORMATION |

COMPUTER SYSTEM AND DEVICE DRIVER INSTALLATION METHOD

CLAIM OF PRIORITY

The present application claims priority from Japanese application serial no. JP2013-161245, filed on Aug. 2, 2013, the content of which is hereby incorporated by reference into this application.

BACKGROUND

The present invention relates to a computer system for installing a device driver and a method for installing the device driver.

The number of devices connected to a computer system has been increasing in recent years. Conventionally, in order to use a device connected to a computer system, the user or maintenance personnel would have to manually install a device driver, which is software for controlling the device. On the other hand, for example, according to the method disclosed in Japanese Unexamined Patent Application Publication No. 2007-280171, it is possible to automatically install a device driver into a computer system in which an OS is installed, by only connecting a peripheral device to the PC body to automatically install a drive, thus making it possible to use the peripheral device.

However, a computer system in which a new OS is installed runs on the minimum program required for OS installation. In this case, unlike a program running on the OS, it is difficult to perform a complicated processing procedure. Thus, in the computer system with a new OS being installed, it is necessary to assist an OS installation program running without being able to perform a complicated processing procedure.

SUMMARY OF THE INVENTION

A computer system in which a new OS is installed may require a device driver that is not recorded in an OS install CD, depending on the device mounted on the computer system. Accordingly, there is a problem that the user and maintenance personnel perform manual installation by preparing a device driver necessary to install the OS.

The present invention has been made in view of the above problem, and an object of the present invention is to provide a computer system without a need for the manual installation of a device driver necessary to install the OS, and a method for installing the device driver.

In order to solve the above problem and achieve the object, a computer system according to the present invention is a computer system connected to a drive for reading a recording medium. The computer system includes: a storage part for storing a first file management table that stores a record associating a device driver that can be installed in the computer system with identification information of a logic area in which the particular device driver is stored, for each device driver; a read part for reading a second file management table stored in a recording medium placed in the drive, storing a record associating a device driver necessary to install a given program with identification information of a logic area in which the particular device driver is stored, for each device driver; a generation part for generating a third table by inserting the record stored in the first management table into the read second management table, and by assigning a new value so that identification information of the device driver stored in the first file management table and identification information of the device driver stored in the second file management table are unique to each other; and an execution part for generating a virtual file management table that associates the third table with the device driver stored in the first table as well as the device driver stored in the second table, and searching for the device driver requested when the give program is installed, from the virtual file management table to install the requested device driver.

Further, the present invention can be understood as a device driver installation method performed by the computer system.

According to the present invention, it is possible to eliminate the need to manually install a device driver necessary for the OS installation.

BRIEF DESCRIPTION OF THE DRAWINGS

FIG. 3 shows a flow chart of the process of generating the virtual file management table;

FIG. 4A is a diagram of an example of the structure of a file management table and table A of an OS install CD;

FIG. 4B is a diagram of an example of the structure of a file management table and table B in a driver CD image of SVM ROM;

FIG. 4C is a diagram of the structure of a table C in which the logic block number, area name, and attached data, which are the information of the out-box device driver, are copied from the file management table of the OS install CD;

FIG. 4F is a diagram of the structure of a virtual file management table in which the Temp table is combined with the information of the table A and the table B;

DETAILED DESCRIPTION

Hereinafter, an embodiment of a computer system and a device driver installation method according to the present invention will be described in detail with reference to the accompanying drawings. Note that the following is an example of the installation of an OS, but the present invention can also be applied to the installation of various programs such as other software and firmware.

Figure 1:
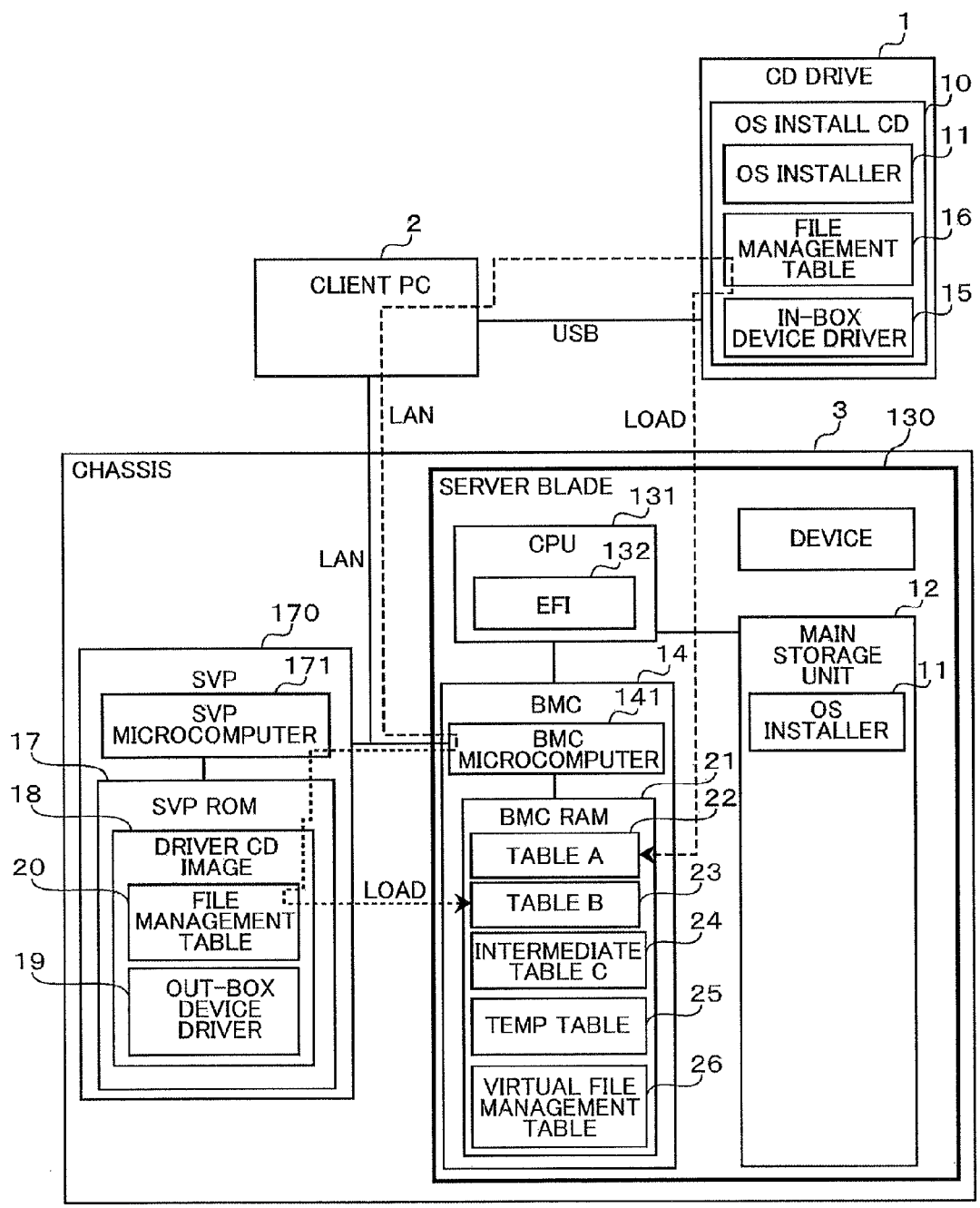
FIG. 1 shows the generation of a virtual file management table.

FIG. 1 is a diagram showing an example of the structure of a computer system according to the present embodiment. As shown in FIG. 1, the computer system includes a CD drive 1, a client PC 2, and a chassis 3 including a service processor (SVP) 170 and a server blade 130. The client PC 2 is connected to the CD drive 1 by a universal serial bus (USB). The client PC 2 is connected to the SVP 170 and the server blade 130 in the chassis 3 by a local area network (LAN).

Further, an OS install CD 10 is placed in the CD drive 1. The OS install CD 10 includes an OS installer 11, which is a program for installing an OS, a file management table 16 for managing files necessary for the installation of the OS, and an in-box device driver 15. The in-box device driver 15 is a device driver necessary for the install CD 10 placed in the CD driver 1.

Further, the SVP 170 is a processor for managing the server blade 130. The SVP 170 includes an SVP microcomputer 171 for issuing various commands to the server blade 130, and an SVP ROM 17 for storing a driver CD image 18 which is the image data of the device driver. An out-box device driver 19 and a file management table 20 are stored in the drive CD image 18. The out-box device driver 19 is a device driver that is stored in the driver CD image 18 of the SVP ROM 17 in advance.

The server blade 130, where the functions of a blade server are integrated on a single substrate, includes a CPU 131 having an extensible firmware interface (EFI) program (hereinafter, simply referred to as EFI) 132, a base management controller (BMC) 14 having a BMC microcomputer 141 and a BMC RAM 21, and a main storage unit 12.

In the installation of a new OS, when the OS installer 11 of the OS install CD 10 is read into the main storage unit 12, the EFI 132 notifies the BMC 14 that the OS installer 11 is read into the main storage unit 12. When receiving the notification from the EFI 132, the BMC 14 copies the file management table 16 in which the link information to the in-box device driver 15 of the OS install CD 10 is recorded, as well as the file management table 20 in which the link information to the out-box device driver 19 of the driver CD image 18 in the SVP ROM 17 is recorded, into the BMC RAM 21. The copied file management table 16 is referred to as a table A22, and the file management table 20 is referred to as a table B23. The BMC 14 generates a table C24, which is an intermediate table, and a Temp table 25, based on the information recorded in the table A22 and the table B23. Then, the BMC 14 finally generates a virtual file management table 26.

Figure 2:
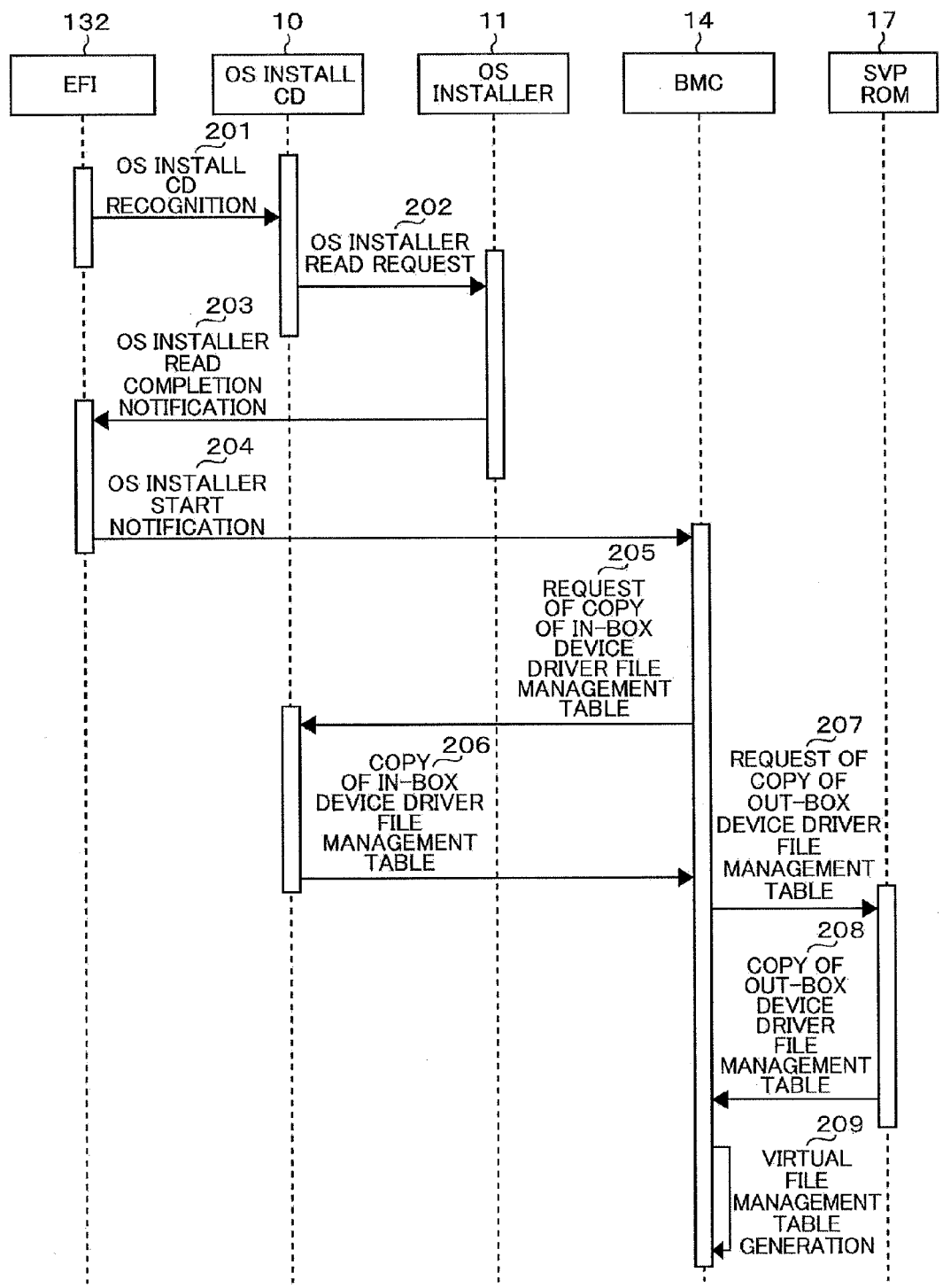
FIG. 2 shows the generation sequence of the virtual file management table.

FIG. 2 is a view of the generation sequence of the virtual file management table 26. The EFI 132 recognizes the OS install CD 10 (step 201). Then, the EFI 132 requests to read the OS installer 11 held by the OS install CD 10 into the main storage unit 12 of the server blade (step 202). The OS installer 11 read into the main storage unit 12 notifies the EFI 132 that the reading of the OS installer has been completed (step 203).

When receiving the read completion notification from the OS installer 11, the EFI 132 notifies the BMC 14 of the start of the OS installer 11 (step 204). The BMC 14 requests the OS install CD 10 to copy the file management table 16 of the in-box device driver 15 held by the OS install CD 10 (step 205). When receiving the request from the BMC 14, the OS install CD 10 copies the file management table 16 into the BMC 14 (step 206).

The BMC 14 requests the SVP ROM 17 to copy the file management table 20 of the out-box driver 19 held by the SVP ROM 17 (step 207). When receiving the request from the BMC 14, the SVP ROM 17 copies the file management table 20 into the BMC 14 (step 208). The BMC 14 generates the virtual file management table 26 based on the copied data of the file management table 16 of the in-box device driver 15, and on the copied data of the file management table 20 of the out-box device driver 19 (step 209). The details of the process of generating the virtual file management table 26 will be described with reference to FIG. 3.

FIG. 3 is a flow chart showing the procedure of the process of generating the virtual file management table 26 (virtual file management table generation process). As shown in FIG. 3, the BMC 14 copies the file management table 16 held by the OS install CD 10 into the BMC RAM 21. The copied table is referred to as the table A (step 301). The BMC 14 copies the file management table 20 held by the driver CD image 18 of the SVM ROM 17 into the BMC RAM 21. The copied table is referred to as the table B (step 302).

The BMC 14 copies the start and end areas of the out-box device driver 19, as well as the logic block numbers corresponding to the respective areas into the BMC RAM 21. Here, the copied table is referred to as the table C (step 303). The BMC 14 copies the table A to generate a Temp table (step 304). The BMC 14 detects the logic block number of the in-box device driver end area from the Temp table, and inserts the copy of the table C into the following logic block (step 305). The BMC 14 adds a given value, which is greater than the number of records of the inserted table C, into the logic block from the out-box device driver start area to the read out area in the Temp table so as to make the logic block number of the Temp table greater than the current logic block number (step 306). Then, the BMC 14 generates the virtual file management table 26 by combining the CD information, the logic block number, the area name, and the attached data information of the A and B tables corresponding to the Temp table (step 307). Note that after generating the virtual file management table 26, the BMC 14 clears the Temp table so as not to compress the BMC RAM 21.

FIG. 4A is a diagram of an example of the structure of the file management table 16 and the table A that are stored in the OS install CD 10. Exemplary values are provided in the logic block number. As shown in FIG. 4A, the tables store the CD information for identifying the OS install CD 10, the logic block number of the data recorded in the CD, the area name of the logic block number, and the data stored in the area of the area name in association with each other. In FIG. 4A, for example, the area of the logic block number from 256 to 999 is defined as a read-in area, in which the read-in information for reading the CD is stored. Further, the area of the logic block number from 1000 to 1998 stores various in-box device drivers (1 to n) in association with the logic block number.

FIG. 4B is a diagram of an example of the structure of the file management table 20 and the table B in the CD image 18 of the SVM ROM 17. Exemplary values are provided in the logic block number. As shown in FIG. 4B, similarly to the case of FIG. 4A, the tables store the CD information for identifying the driver CD image 18, the logic block number of the data recorded in the CD, the area name of the logic block number, and the data stored in the area of the area name in association with each other. In FIG. 4B, for example, the area of the logic block number from 256 to 999 is defined as a read-in area, in which the read-in information for reading the CD is stored. Further, the area of the logic block number from 1000 to 1998 stores various out-box device drivers (1 to n) in association with the logic block number.

FIG. 4C is a diagram of an example of the structure of the table C, which is the copy of the logic block number, the area name, and the attached data, in which the out-box device driver of the table B is stored. Exemplary values are provided in the logic block number. As shown in FIG. 4C, the table C is the copy of the record of the logic block number from 1000 to 1998 in which the various out-box device drivers (1 to n) are stored.

Figures 4D, 4E:
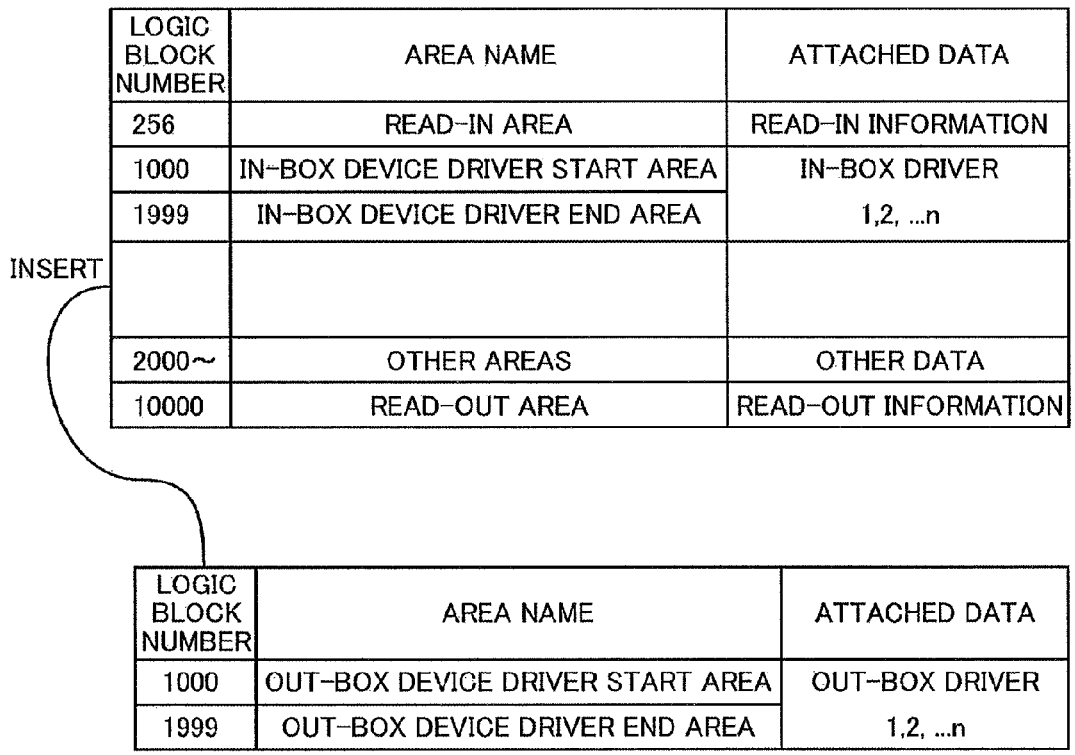
FIG. 4D is a diagram of the structure in which a Temp table is generated by inserting the table C into the table A.
FIG. 4E is a diagram of the structure in which a given value is added to the logic block number of the Temp table.

FIG. 4D is a diagram of the structure of the Temp table in which the table C is inserted into the table A. Exemplary values are provided in the logic block number. As shown in FIG. 4D, the Temp table is the table in which the table C is inserted into the area next to the area of the logic number block from 1000 to 1999 in which the in-box device driver (1 to n) of the table A is stored.

FIG. 4E is a diagram of the structure in which a given value is added to the logic block number of the Temp table. Exemplary values are provided in the logic block number. As shown in FIG. 4E, in the Temp table after the insertion of the table C, a new value is assigned to the logic block number of the table C as the logic number following the areas of the logic numbers from 1000 to 1999 in the table A in which the in-box device drivers (1 to n) are stored. Further, according to the assigned number, a new value is assigned to the following logic block number of another area and the read-out area in the table A. In other words, the logic block number of the in-box device drivers (1 to n) and the logic block number of the out-box device drivers (1 to n) are unique to each other. Thus, it is found that the area from the read-in area to the read-out area has consecutive logic block numbers.

FIG. 4F is a diagram of the structure of the virtual file management table 26 generated by connecting the information of the tables A and B to the Temp table. Exemplary values are provided in the logic block number. As shown in FIG. 4F, the virtual file management table 26 is the table in which the Temp table shown in FIG. 4E, and a joined table are stored in association with each other. The joined table is the table in which the table A shown in FIG. 4A and the table C shown in FIG. 4C are connected in the same order as the order of the Temp table. In the example shown in FIG. 4F, the logic block numbers of the table B and the logic block numbers of the joined table (the actual logic block numbers which are the logic block numbers of the original tables A and B) are stored in association with each other. The BMC 14 reads a record of the virtual file management table 26 with a logic block number as a key, and notifies the OS installer 11 of the logic block number. The OS installer 11 reads the data (actual attached data) that is actually attached as the in-box device driver (1 to n) or out-box device driver (1 to n) of the actual logic block number corresponding to the particular logic block number. Then, the OS installer 11 reads the device driver into the main storage unit 12.

Figure 5:
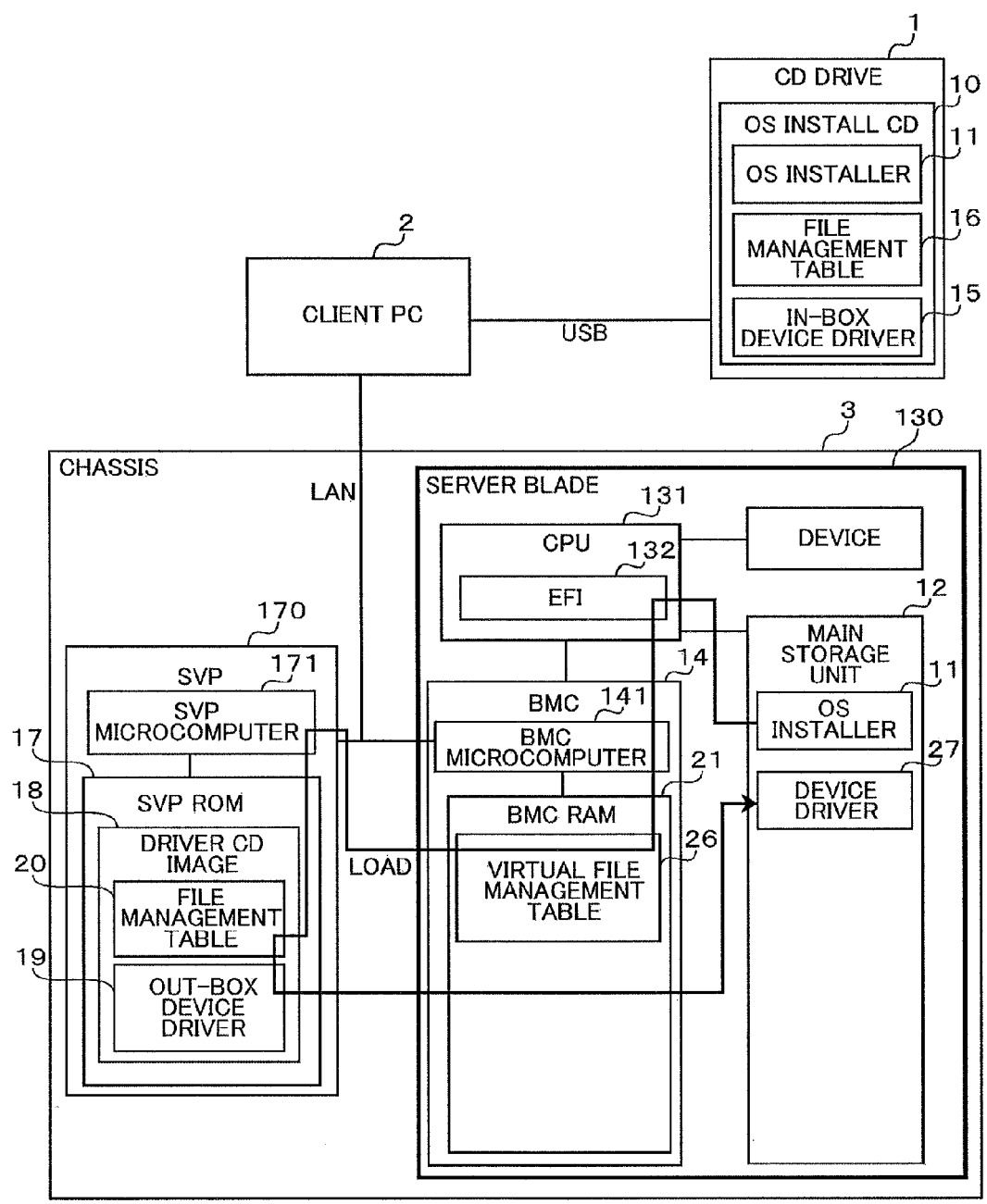
FIG. 5 shows that in response to a request of a device driver from the OS installer, BMC notifies the OS installer of the path of the out-box device driver and the device driver is read into a main storage unit.

FIG. 5 shows that the BMC 14 notifies of the path of the out-box device driver 19 in response to the request of the device driver 27 from the OS installer 11, and that the device driver 27 is read into the main storage unit 12. The OS installer 11 in the main storage unit 12 requests the device driver 27 to the BMC 14 through the EFI 132. In response to the request from the OS installer 11, the BMC 14 notifies the OS installer 11 of the CD information of the corresponding file, the actual logic block number, the actual area number, and the actual attached data from the virtual file management table 26 in the BMC RAM 21. If no corresponding file exists, the installation of the device driver is stopped. Further, after the generation of the virtual file management table 26, the BMC 14 clears the Temp table so as not to compress the BMC RAM 21.

Figure 6:
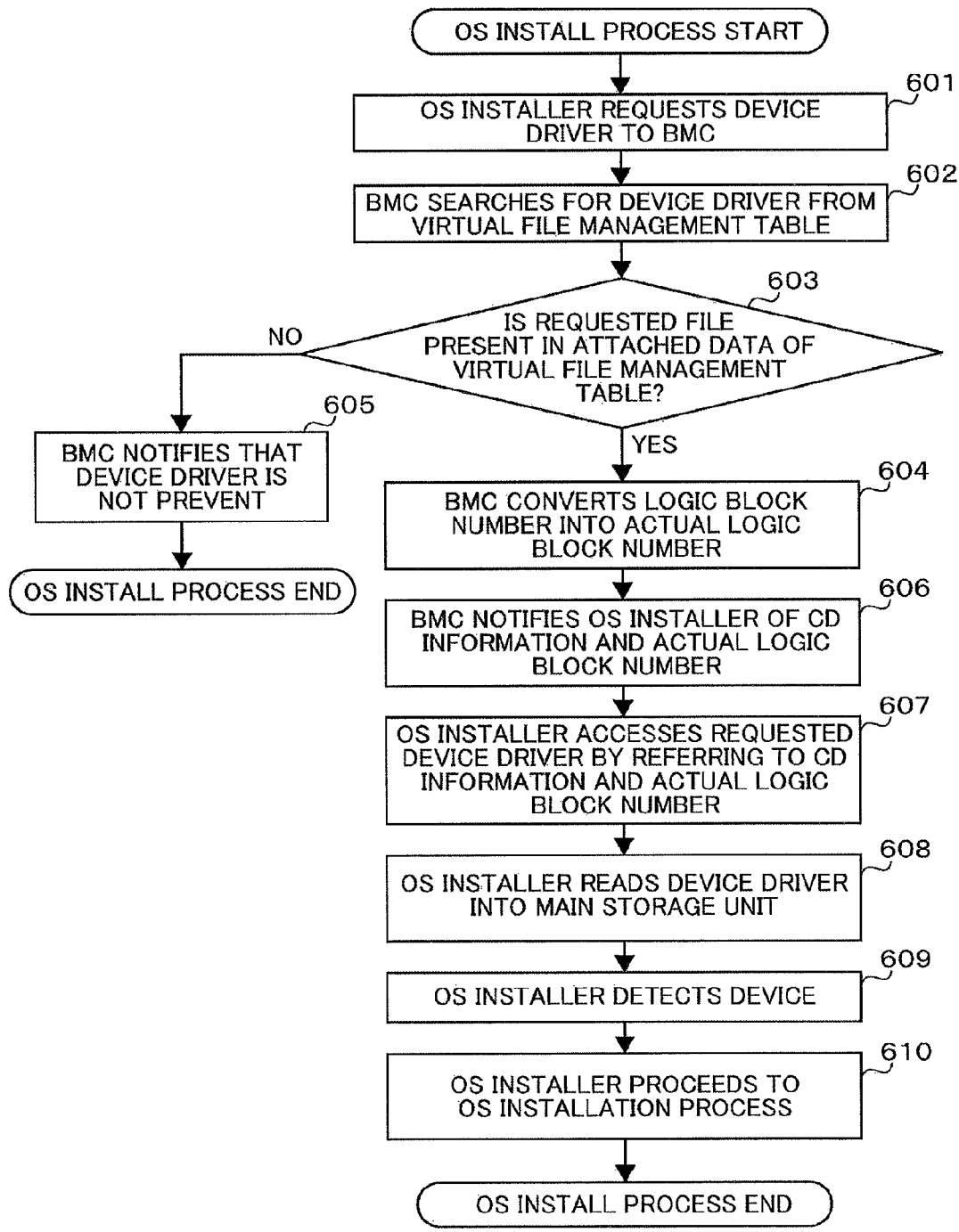
FIG. 6 is a flow chart of the OS installation process in which the OS installer detects the out-box device driver from the virtual file management table stored in BMC and BMC RAM.

FIG. 6 is a flow chart of the process in which the OS installer 11 detects the out-box device driver 19 from the virtual file management table 26 recorded in the BMC 14 and the BMC RAM 21 in the OS installation process. The OS installer 11 requests the device driver to the BMC 14 in order to control and operate the device necessary for the OS installation (step 601).

The BMC 14 searches for the device driver corresponding to the request of the OS installer 11 from the virtual file management table 26 recorded in the BMC RAM 21 (step 602). The BMC 14 checks and determines if the requested device driver exists in the attached data of the virtual file management table 26 (step 603).

If it is determined that the device driver exists (step 603: YES), the BMC 14 changes the logic block number into the actual logic block number (step 604). On the other hand, if it is determined that the device driver does not exist (step 603: NO), the BMC 14 notifies the OS installer 11 that no file exists, and stops the process of the flow chart (step 605).

The BMC 14 notifies the OS installer 11 of the CD information and the actual logic block number corresponding to the device driver requested by the OS installer 11, from the virtual file management table 26 (step 606). The OS installer 11 accesses the requested device driver from the CD information and the actual logic block number indicated by the logic block number, without being aware of the OS install CD in which the in-box driver is stored as well as the driver CD image in which the out-box driver is stored, by referring to the logic block number notified from the BMC 14 (step 607).

The OS installer 11 reads the device driver into the main storage unit 12, without requesting the user and maintenance personnel, who perform the installation operation, to change and detect the recording medium in which the device driver is recorded by once stopping the OS installation, which has been necessary in the conventional installation (step 608). Then, the OS installer 11 detects the requested device (step 609). Because the device is detected, the OS installation can be carried out. Thus, the OS installer 11 continues the following OS installation process (step 610).

As described above, according to the present embodiment, the computer system can automatically reads a device driver in the installation of a new OS by using the virtual file management table generated by the BMC, and using the driver CD image prepared in advance, without the need for the user and maintenance personnel to prepare a device driver necessary for the OS installation and manually install the device driver. As a result, the user and maintenance personnel can carry out the OS installation without taking into account the device driver necessary for the OS installation.

Note that the present invention is not limited to the exemplary embodiment and includes various modifications and changes. For example, in the above embodiment, if no file exists in the OS installer 11, the BMC notifies the OS installer 11 of the fact that no file exists in the OS installer 11 to stop the process of the flow chart in step 605. However, it is also possible that the BMC searches for the requested device driver from SVP held by another chassis connected through LAN to obtain the device driver, stores the obtained device driver in the driver CD image 18 as the new out-box device driver 19 while updating the record of the file management table 20 (for example, updating the record by adding the information of the new device diver to the area of the logic block number from 1000 to 1998 in which the out-box device drivers (1 to n) are stored in FIG. 4B), performs again the process of generating the virtual file management table 26 shown in FIG. 3, and then performs the installation process shown in FIG. 6.

In this case, even if the requested device driver does not present in the chassis having the server blade where the OS installation process is performed, the OS installation process can be continued automatically. Further, the file management table 20 is updated by adding a new device driver to the out-box device driver 19. Thus, if a request of the same device driver is received next time, it is possible to quickly install the OS without searching another chassis.

What is claimed is:

1. A device driver installation method performed by a computer system connected to a drive for reading a recording medium,
wherein the recording medium stores an OS installer, in-box device drivers to be requested by the OS installer, and a recording medium file management table which stores relationships between the in-box device drivers and identification information of logic areas in which the in-box device drivers are stored, wherein the computer system comprises
- a server blade including a CPU, main storage unit, and a base management controller (BMC); and
- a service processor (SVP) storing out-box device drivers that are not the in-box device drivers, and a SVP file management table which stores relationships between the out-box device drivers and the identification information of logic areas in which the in-box device drivers are stored, the device driver installation method comprising:
- reading, by the CPU, the OS installer stored in the recording medium into the main storage unit;
- copying, by the BMC, the recording medium file management table in the recording medium and the SVP file management table in the SVP into the BMC, before reading the OS installer;
- generating, by the BMC, a third table by inserting a record of the out-box device drivers stored in the copied SVP file management table into the copied recording medium file management table, before reading the OS installer;
- assigning new identification information of logic areas to the out-box device drivers so that the identification information of logic areas for the out-box device drivers and the identification information of logic areas for the in-box device drivers are unique to each other;
- generating, by the BMC, a virtual file management table in the BMC, by connecting information of the copied SVP file management table and the copied recording medium file management table to the third table, before reading the OS installer;
- searching, by the CPU reading the OS installer in the main storage unit, for a device driver requested by OS installation to the server blade, using the virtual file management table in the BMC; and
- installing, by the CPU, the requested device driver from the recording medium and the SVP;

wherein the recording medium file management table, the SVP file management table, the third table, and the virtual file management table are distinct tables.

2. The device driver installation method according to claim 1, wherein if the requested device driver may not be found using the virtual file management table, the BMC obtains the requested device driver from another computer system connected to the computer system.

3. The device driver installation method according to claim 2, wherein the BMC stores the device driver obtained from the other computer system.

4. The device driver installation method according to claim 1, wherein the BMC clears the third table after generating the virtual file management table.

5. A computer system connected to a drive for reading a recording medium, the recording medium storing an OS installer, in-box device drivers to be requested by the OS installer, and a recording medium file management table which stores relationships between the in-box device drivers and identification of logic areas in which the in-box device drivers are stored, the computer system comprising:
- a server blade including a CPU, main storage unit, and a base management controller (BMC);
- a service processor (SVP) storing out-box device drivers that are not the in-box device drivers, and a SVP file management table that stores relationships between the out-box device drivers and the identification information of logic areas in which the in-box device drivers are stored, wherein the CPU is configured to read the OS installer in the recording medium into the main storage unit, wherein the BMC is configured to, before the CPU reads the OS installer:
- copy the recording medium file management table in the recording medium and the SVP file management table in the SVP into the BMC;
- generate a third table by inserting a record of the out-box device drivers stored in the copied SVP file management table into the copied recording medium file management table;
- assign new identification information of logic areas for the out-box device drivers so that the identification information of logic areas for the out-box device drivers and the identification information of logic areas for the in-box device drivers are unique to each other; and
- generate a virtual file management table in the BMC, by connecting information of the copied SVP file management table and the copied recording medium file management table to the third table, before reading the OS installer, and wherein the CPU is further configured to:
- search, when reading the OS installer into the main storage unit, for a device driver requested by OS installation to the server blade, using the virtual file management table in the BMC; and
- install the requested device driver from the recording medium and the SVP;

wherein the recording medium file management table, the SVP file management table, the third table, and the virtual file management table are distinct tables.

6. The computer system according to claim 5, wherein if the requested device driver may not be found using the virtual file management table, the BMC obtains the requested device driver from another computer system connected to the computer system.

7. The computer system according to claim 6, wherein the BMC stores the device driver obtained from the other computer.

8. The computer system according to claim 5, wherein the BMC clears the third table after generating the virtual file management table.

* * * * *